S. COATS.
REVOLVING HAY RAKE.
No. 163. Patented Apr. 17, 1837.
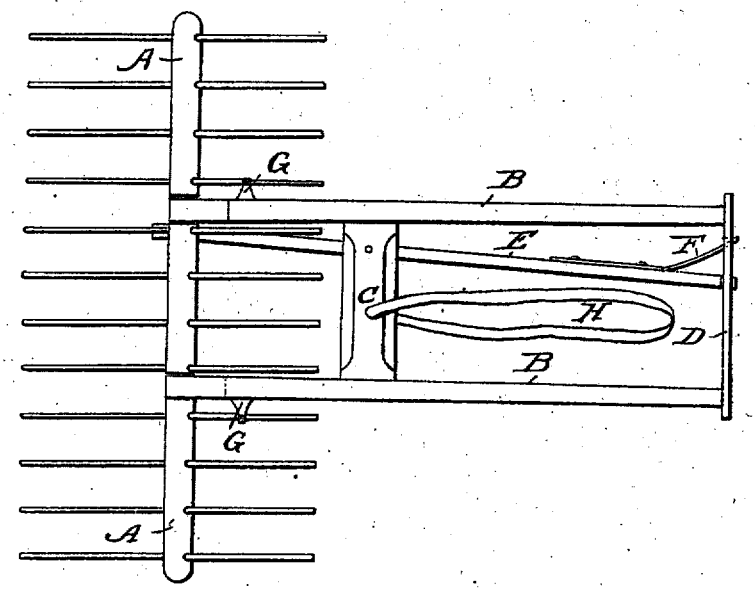
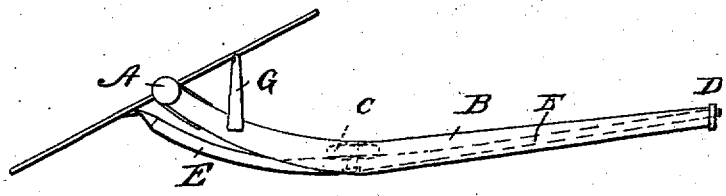

UNITED STATES PATENT OFFICE.

STEPHEN COATS, OF SHOREHAM, VERMONT.

REVOLVING HAND-RAKE FOR HAY AND GRAIN.

Specification of Letters Patent No. 163, dated April 17, 1837.

*To all whom it may concern:*

Be it known that I, STEPHEN COATS, of Shoreham, in the county of Addison and State of Vermont, have invented a new and useful Improvement in Revolving Rakes for Raking Hay and Grain.

The following specification, with its references to the drawing hereto annexed, and which is intended to form part of the same, contains a description of the whole of said rake, with the said improvement therewith connected.

A, A, in the drawing, represents the head of the rake, about six feet long, and the teeth, about two feet ten inches long, running through the same, B, B, the shafts of the rake, six and a half feet long, bent downward, at their lower extremities, about seven or eight inches from the line of the main body thereof, which lower extremities are fastened to the head, by straps of iron passing around the same, in gains made in the head, and fashioned so that the head will revolve in said straps. Circular grooves are cut in the lower extremities of the shafts so that about half the head may play therein, it being secured on the outer side by the straps aforesaid. The shafts are fastened together by the cross bar C, three inches in width—placed far enough from the head to permit the teeth to revolve, as the head turns over—and also by the small crossbar D, at the upper ends of the shafts. These cross bars are about two feet in length.

E, represents the tender, which is fastened by a bolt to the wide cross bar, C, in such a manner that it will play horizontally thereon. The upper end of the tender passes through a throat or chase mortise in the cross bar D, and is pressed to the left side of the mortise by the steel spring F, which also passes through the mortise, and is fastened by a rivet or screw, at its lower end, to the tender. The lower end of the tender is bent to strike and rest upon a dog which is fastened upon the tooth next within the right hand shaft, about four inches from the head, so as to prevent the rake from turning over while it is filling. The lower end of the tender should be pointed with iron, and the dog should be made of iron, and fastened to the tooth by nails or screws.

H, represents a strap, the two ends of which are fastened to the cross bar C. Within this strap the person using the rake places himself, and moves the same by the forward motion of his body.

The rake, while filling, is kept in a firm position by the tender resting on the dog as above described, and the points of the teeth are kept down to the ground by the steel braces G, G, which are fastened to the outside of each shaft, and rest on the first teeth without the shafts. These braces are so constructed as to spring when the teeth against which they are designed to press revolve forward. Upon such revolution they press against the braces and turn them aside. After passing them, the braces resume their natural position, and the passing teeth are brought under them as above described.

In using the rake, the person moving it, when it is filled, presses the upper end of the tender toward the right shaft, whereby the lower end of the tender is thrown off from the tooth on which it rests while the rake is filling, and the head turns over and unloads; and as the teeth again come to a horizontal position, the head is held in that position by the end of the tender, (which now resumes its natural position, by means of the spring F,) pressing upon a dog similar to the one above described, upon the other end, and on the other side of the tooth, and is again ready to be drawn forward and filled.

In unloading the rake, the person drawing it presses down the forward ends of the shafts, whereby the braces above described are pressed against the teeth on which they rest, and the head of the rake is thereby raised upon the forward ends of the teeth, and revolves by the horizontal pressure of the load. Those parts of the teeth which press against the steel braces upon the revolution of the head, and after its revolution is performed are protected from wear by a strap of tin or sheet iron, passing around the teeth.

What I claim as my invention, and desire to secure by Letters Patent is—

The construction and use of the tender and spring E and F, the strap H, and the braces G, G, as above described.

STEPHEN COATS.

Witnesses:

WILLIAM SLADE,

E. D. BARTON.